United States Patent
Yu

(10) Patent No.: US 9,366,484 B2
(45) Date of Patent: Jun. 14, 2016

(54) HEAT DISSIPATION PIPE LOOP AND BACKLIGHT MODULE USING SAME

(71) Applicant: Shenzhen China Star Optoelectronics Technology Co., Ltd., Shenzhen, Guangdong (CN)

(72) Inventor: Gang Yu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 250 days.

(21) Appl. No.: 14/129,982

(22) PCT Filed: Nov. 28, 2013

(86) PCT No.: PCT/CN2013/088083
§ 371 (c)(1),
(2) Date: Dec. 29, 2013

(87) PCT Pub. No.: WO2015/074287
PCT Pub. Date: May 28, 2015

(65) Prior Publication Data
US 2015/0138830 A1 May 21, 2015

(30) Foreign Application Priority Data
Nov. 19, 2013 (CN) .......................... 2013 1 0586121

(51) Int. Cl.
*F21V 29/00* (2015.01)
*F28D 15/04* (2006.01)
(Continued)

(52) U.S. Cl.
CPC ............ *F28D 15/043* (2013.01); *G02B 6/0031* (2013.01); *G02B 6/0085* (2013.01);
(Continued)

(58) Field of Classification Search
CPC ... F28D 15/043; G02B 6/0031; G02F 1/1336; F21Y 2101/02
USPC .............. 362/97.1, 97.2, 97.3, 294, 345, 373, 362/615; 165/104.21
See application file for complete search history.

(56) References Cited

U.S. PATENT DOCUMENTS 4,573,524 A * 3/1986 Kotaka .................... F23D 14/66
165/104.14
2006/0133090 A1* 6/2006 Noh .................. G02F 1/133603
362/294
(Continued)

FOREIGN PATENT DOCUMENTS

CN 102313191 A 1/2012
CN 102352981 A 2/2012
(Continued)

*Primary Examiner* — Anh Mai
*Assistant Examiner* — Glenn Zimmerman
(74) *Attorney, Agent, or Firm* — Andrew C. Cheng

(57) ABSTRACT

A heat dissipation pipe loop and a backlight module using the heat dissipation pipe loop are provided. The heat dissipation pipe loop includes: a first evaporator section, a second evaporator section arranged opposite to the first evaporator section, a first pipe, a second pipe arranged opposite to the first pipe, and a heat dissipation liquid arranged in the first pipe and the second pipe. The first pipe includes a first gas pipe connected to the first evaporator section, a first condenser pipe connected to the first gas pipe, and a first liquid pipe connected to the first condenser pipe and the second evaporator section. The second pipe includes a second gas pipe connected to the second evaporator section, a second condenser pipe connected to the second gas pipe, and a second liquid pipe connected to the second condenser pipe and the first evaporator section.

15 Claims, 6 Drawing Sheets

(51) Int. Cl.
  *F21V 8/00* (2006.01)
  *G02F 1/1335* (2006.01)
  *F21Y 101/02* (2006.01)

(52) U.S. Cl.
  CPC ........ *G02F1/1336* (2013.01); *G02F 1/133615* (2013.01); *F21Y 2101/02* (2013.01); *G02F 2001/133628* (2013.01)

(56) References Cited

U.S. PATENT DOCUMENTS

| | | | | |
|---|---|---|---|---|
| 2006/0279706 | A1* | 12/2006 | Bash | G03B 21/18 353/54 |
| 2007/0189012 | A1* | 8/2007 | Huang | F21V 29/004 362/294 |
| 2008/0164010 | A1* | 7/2008 | Kang | F28D 15/0266 165/104.26 |
| 2009/0314470 | A1* | 12/2009 | Yang | F28D 15/0233 165/104.26 |
| 2010/0163212 | A1* | 7/2010 | Chin | F28D 15/0266 165/104.26 |
| 2010/0307018 | A1* | 12/2010 | Driussi | D06F 58/206 34/79 |
| 2012/0132402 | A1* | 5/2012 | Aoki | F28D 15/0266 165/104.21 |
| 2012/0229726 | A1* | 9/2012 | Kim | G02F 1/1336 349/58 |
| 2013/0180278 | A1* | 7/2013 | Yamashita | F25B 6/04 62/335 |
| 2013/0265781 | A1* | 10/2013 | Yang | F28F 3/02 362/373 |

FOREIGN PATENT DOCUMENTS

| | | |
|---|---|---|
| CN | 102691999 A | 9/2012 |
| CN | 203117610 U | 8/2013 |
| CN | 103348185 A | 10/2013 |
| JP | 2006127833 A | 5/2006 |

* cited by examiner

HEAT DISSIPATION PIPE LOOP AND BACKLIGHT MODULE USING SAME

BACKGROUND OF THE INVENTION

1. Field of the Invention

The present invention relates to the field of heat dissipation, and in particular to a heat dissipation pipe loop and a backlight module using the heat dissipation pipe loop.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, a plurality of vertical and horizontal tiny wires is arranged between the two glass substrates and application of electricity is selectively made to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light emission source, which is arranged at the backside of the liquid crystal display panel to form a planar light source directly supplied to the liquid crystal display panel. The side-edge backlight module comprises a light emission source, which is arranged at an edge of a backplane to be located rearward of one side of the liquid crystal display panel. The light emitting from the light emission source enters a light guide plate (LGP) through a light incident face at one side of the light guide plate and is projected out of a light exit face of the light guide plate, after being reflected and diffused, to pass through an optic film assembly to form a planar light source for the liquid crystal display panel.

Heretofore, commonly used light emission sources include a cold cathode fluorescent lamp (CCFL), an external electrode fluorescent lamp (EEFL), and a light-emitting diode (LED), among which the LED is advantageous in respect of environmental conservation and extended life span and is thus widely used. A heat dissipation device that is provided for dissipation of heat from the LED is a vital part for the purposes of preventing the backlight module from getting deteriorated and extending the life span of the backlight module.

In the state of the art, it is common to arrange a heat dissipation pipe loop under a printed circuit board (PCB) on which a plurality of LED lights is mounted in order to achieve heat dissipation of the LED lights.

Referring to FIG. 1, which is a schematic view showing a conventional LED heat dissipation pipe loop, the pipe loop is composed of alloy pipes made of a metal, such as copper and titanium and comprises a liquid pipe 100, an evaporator section 300, a gas pipe 500, and a condenser pipe 700. The heat dissipation pipe loop is filled with a heat dissipation liquid that can readily evaporate through absorption of heat (including water, Freon refrigerant, ammonia, and methanol). The heat dissipation liquid passes through the liquid pipe 100 into the evaporator section 300 to absorb heat and evaporate into a gas that enters the gas pipe 500 and passes through the condenser pipe 70 to get condensed into liquid for entering the liquid pipe 100 against. This cycle is repeated to enhance the heat dissipation effect.

Although the heat dissipation pipe loop of such an arrangement achieves a bettered effect of heat dissipation, installation of a greater number of heat dissipation pipe loops is required for a backlight module including an increased number of LED lights from which heat is to be dissipated.

Referring to FIG. 2, a schematic view is given to show conventional installation of an LED heat dissipation pipe loop. A regular side-edge backlight module comprises two sets of backlight source 900 that are arranged opposite to each other. Each backlight source 900 comprises a printed circuit board 902 and a plurality of LED lights 904 mounted on the printed circuit board 902. Thus, four identical heat dissipation pipe loops are adopted in such an arrangement of backlight module to dissipate heat. Two of the heat dissipation pipe loops are arranged under each of the printed circuit boards 902 for dissipating heat from the LED lights thereof. In installation, the printed circuit boards 902 are positioned against evaporator sections 300 of the heat dissipation pipe loops.

Thus, such an arrangement of the heat dissipation pipe loop requires an increased number of heat dissipation components to be used in the backlight module, thereby increasing the cost of heat dissipation and the cost of manufacture, and also complicating the assembling operation.

SUMMARY OF THE INVENTION

An object of the present invention is to provide a heat dissipation pipe loop that has an easy operation for assembling, ensures a bettered heat dissipation effect, reduces the number of portions of heat dissipation liquid used, and lowers down manufacturing costs.

Another object of the present invention is to provide a backlight module using a heat dissipation pipe loop, which has an easy operation of assembling and ensures a bettered heat dissipation effect, and allows a portion of heat dissipation liquid to achieve heat dissipation for two sets of backlight source so as to reduce the number of portions of heat dissipation liquid used and lower down manufacturing costs.

To achieve the above objects, the present invention provides a heat dissipation pipe loop, which comprises: a first evaporator section, a second evaporator section arranged opposite to the first evaporator section, a first pipe connected to the first evaporator section and the second evaporator section, a second pipe connected to the first evaporator section and the second evaporator section and arranged opposite to the first pipe and a heat dissipation liquid arranged in the first pipe and the second pipe. The first evaporator section, the first pipe, the second evaporator section, and the second pipe are sequentially connected in a tail end to leading end manner so as to form a closed loop. The first pipe comprises a first gas pipe connected to the first evaporator section, a first condenser pipe connected to the first gas pipe, and a first liquid pipe connected to the first condenser pipe and the second evaporator section. The second pipe comprises a second gas pipe connected to the second evaporator section, a second condenser pipe connected to the second gas pipe, and a second liquid pipe connected to the second condenser pipe and the first evaporator section.

The first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage.

The heat dissipation liquid is composed of water, Freon refrigerant, ammonia, and methanol.

The first pipe and the second pipe are made of at least one of copper and titanium.

The present invention also provides a backlight module that uses a heat dissipation pipe loop, comprising: a backplane, a light guide plate mounted in the backplane, two backlight sources mounted in the backplane, a heat dissipation pipe loop arranged between the backplane and the backlight sources, and a reflector plate arranged between the backplane and the light guide plate. The heat dissipation pipe loop comprises: a first evaporator section, a second evaporator section arranged opposite to the first evaporator section, a first pipe connected to the first evaporator section and the second evaporator section, a second pipe connected to the first evaporator section and the second evaporator section and arranged opposite to the first pipe and a heat dissipation liquid arranged in the first pipe and the second pipe. The first evaporator section, the first pipe, the second evaporator section, and the second pipe are sequentially connected in a tail end to leading end manner so as to form a closed loop. The first pipe comprises a first gas pipe connected to the first evaporator section, a first condenser pipe connected to the first gas pipe, and a first liquid pipe connected to the first condenser pipe and the second evaporator section. The second pipe comprises a second gas pipe connected to the second evaporator section, a second condenser pipe connected to the second gas pipe, and a second liquid pipe connected to the second condenser pipe and the first evaporator section. The two backlight sources are respectively arranged on the first evaporator section and the second evaporator section.

The first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage.

Each of the backlight sources comprises a printed circuit board and a plurality of LED (Light-Emitting Diode) lights mounted to and electrically connected with the printed circuit board. The two printed circuit boards of the two backlight sources are respectively and directly positioned against the first heat transfer layer and the second heat transfer layer.

The heat dissipation liquid is composed of water, Freon refrigerant, ammonia, and methanol.

The first pipe and the second pipe are made of at least one of copper and titanium.

The backplane comprises a bottom board and a plurality of side boards perpendicularly connected to the bottom board. The bottom board comprises a first bottom board section and two second bottom board sections that are arranged to each show a stepped connection with the first bottom board section. The printed circuit boards and the first evaporator section and the second evaporator section of the heat dissipation pipe loop are arranged on the second bottom board sections. Upper surfaces of the printed circuit boards are substantially flush with an upper surface of the first bottom board section.

The present invention further provides a backlight module that uses a heat dissipation pipe loop, comprising: a backplane, a light guide plate mounted in the backplane, two backlight sources mounted in the backplane, a heat dissipation pipe loop arranged between the backplane and the backlight sources, and a reflector plate arranged between the backplane and the light guide plate, the heat dissipation pipe loop comprising: a first evaporator section, a second evaporator section arranged opposite to the first evaporator section, a first pipe connected to the first evaporator section and the second evaporator section, a second pipe connected to the first evaporator section and the second evaporator section and arranged opposite to the first pipe band a heat dissipation liquid arranged in the first pipe and the second pipe, the first evaporator section, the first pipe, the second evaporator section, and the second pipe being sequentially connected in a tail end to leading end manner so as to form a closed loop, the first pipe comprising a first gas pipe connected to the first evaporator section, a first condenser pipe connected to the first gas pipe, and a first liquid pipe connected to the first condenser pipe and the second evaporator section, the second pipe comprising a second gas pipe connected to the second evaporator section, a second condenser pipe connected to the second gas pipe, and a second liquid pipe connected to the second condenser pipe and the first evaporator section, the two backlight sources being respectively arranged on the first evaporator section and the second evaporator section;

wherein the first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage.

Each of the backlight sources comprises a printed circuit board and a plurality of LED (Light-Emitting Diode) lights mounted to and electrically connected with the printed circuit board. The two printed circuit boards of the two backlight sources are respectively and directly positioned against the first heat transfer layer and the second heat transfer layer.

The heat dissipation liquid is composed of water, Freon refrigerant, ammonia, and methanol.

The first pipe and the second pipe are made of at least one of copper and titanium.

The backplane comprises a bottom board and a plurality of side boards perpendicularly connected to the bottom board. The bottom board comprises a first bottom board section and two second bottom board sections that are arranged to each show a stepped connection with the first bottom board section. The printed circuit boards and the first evaporator section and the second evaporator section of the heat dissipation pipe loop are arranged on the second bottom board sections. Upper surfaces of the printed circuit boards are substantially flush with an upper surface of the first bottom board section.

The efficacy of the present invention is that the present invention provides a heat dissipation pipe loop and a backlight module using the heat dissipation pipe loop, in which all the components that constitute the heat dissipation pipe loop are integrally formed so as to allow the backlight module that uses the heat dissipation pipe loop to be assembled with an easy operation of easy and also allow heat dissipation from a plurality of LED lights of two sets of backlight sources to be achieved with only one portion of heat dissipation liquid filled therein thereby ensuring a bettered effect of heat dissipation, lowering down the manufacture costs of the heat dissipation pipe loop and the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
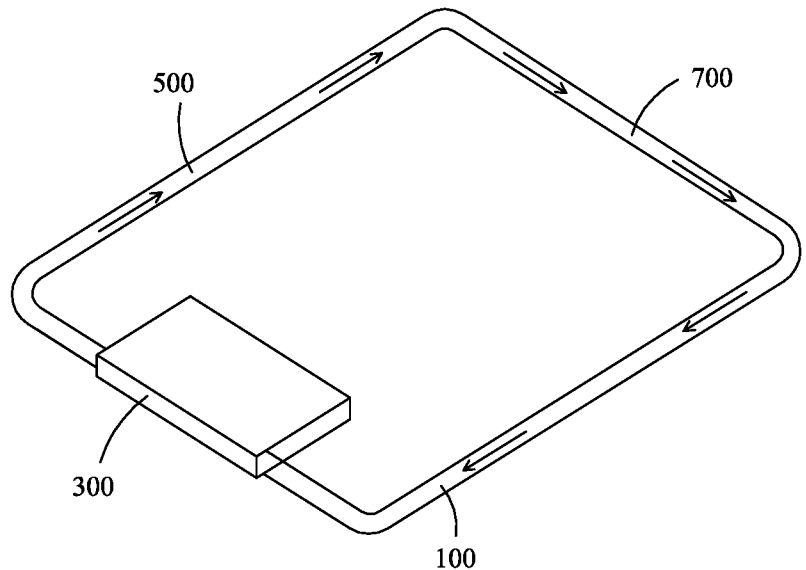
FIG. 1 is a schematic view showing a conventional heat dissipation pipe loop.
Figure 2:
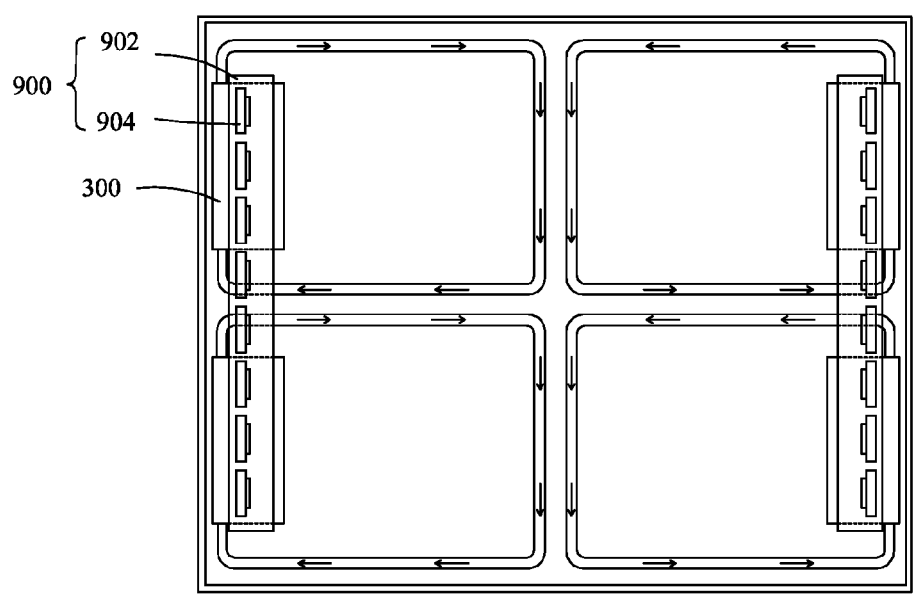
FIG. 2 is a schematic view showing the installation of conventional heat dissipation pipe loops.
Figure 3:
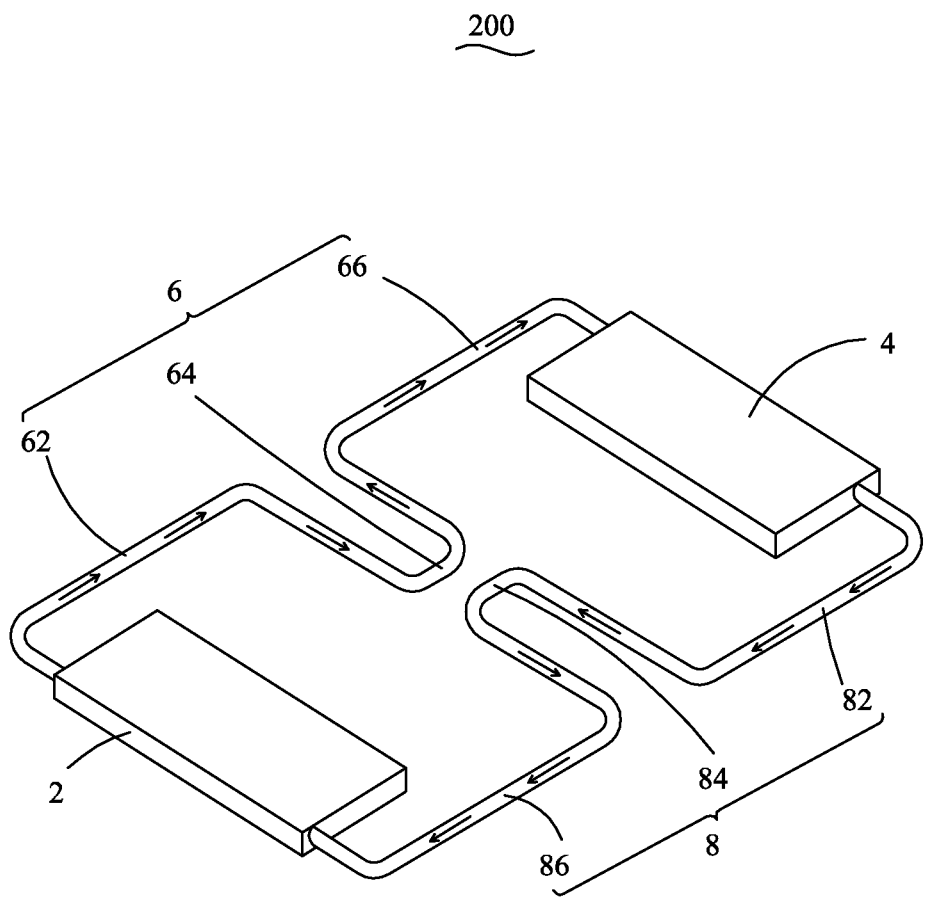
FIG. 3 is a schematic view showing a heat dissipation pipe loop according to the present invention.

Referring to FIG. 3, the present invention provides a heat dissipation pipe loop, which comprises: a first evaporator section 2, a second evaporator section 4 arranged opposite to the first evaporator section 2, a first pipe 6 connected to the first evaporator section 2 and the second evaporator section 4, a second pipe 8 connected to the first evaporator section 2 and the second evaporator section 4 and arranged opposite to the first pipe 6, and a heat dissipation liquid arranged in the first pipe 6 and the second pipe 8. The first evaporator section 2, the first pipe 6, the second evaporator section 4, and the second pipe 8 are sequentially connected in a tail end to leading end manner so as to form a closed loop. The first pipe 6 comprises a first gas pipe 62 connected to the first evaporator section 2, a first condenser pipe 64 connected to the first gas pipe 62, and a first liquid pipe 66 connected to the first condenser pipe 64 and the second evaporator section 4. The second pipe 8 comprises a second gas pipe 82 connected to the second evaporator section 4, a second condenser pipe 84 connected to the second gas pipe 82, and a second liquid pipe 86 connected to the second condenser pipe 84 and the first evaporator section 2. Preferably, the first condenser pipe 64 has a U-shaped structure, and the second condenser pipe 84 also has a U-shaped structure. Structurally, the first pipe 6 and the second pipe 8 are arranged to show a symmetric structure, but the symmetric portions thereof are of functions that are not identical. In the instant embodiment, the first condenser pipe 64 and the second condenser pipe 84 are arranged in an inward recessed form in order to reduce the length of the first pipe 6 and the second pipe 8 and thus reduce the area occupied by the heat dissipation pipe loop.

The first pipe 6 and the second pipe 8 are made of at least one of copper and titanium. In the instant embodiment, the first pipe 6 and the second pipe 8 are made of alloys of copper and titanium.

The heat dissipation liquid is filled into the pipes during the manufacture of the heat dissipation pipe loop. Further, in the manufacture, the environment in which the heat dissipation liquid is filled into the heat dissipation pipe loop is a vacuum environment in order to prevent gases of the atmosphere from entering the heat dissipation pipe loop and thus occupying the internal space of the pipes.

The heat dissipation liquid is composed of water, Freon refrigerant, ammonia, and methanol. The heat dissipation liquid flows in the heat dissipation pipe loop in the direction indicated by the arrows of FIG. 3.

Figure 4:
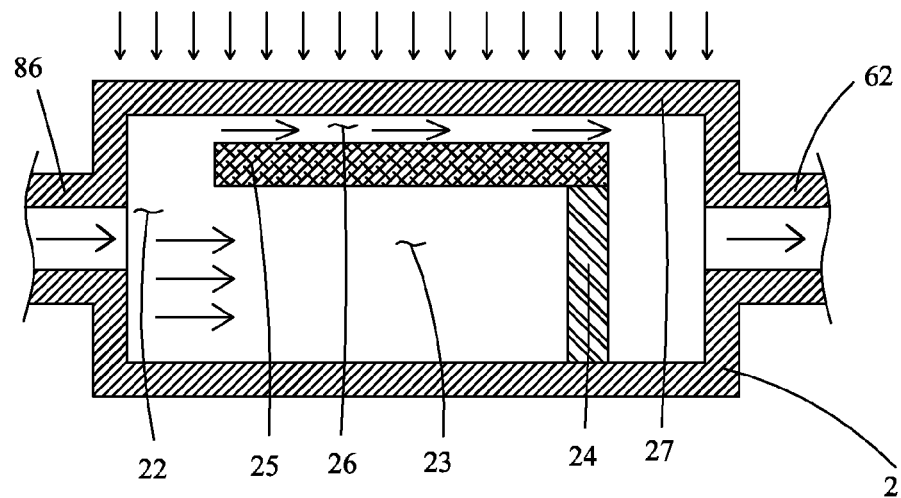
FIG. 4 is a schematic view showing a second evaporator section of the heat dissipation pipe loop according to the present invention.
Figure 5:
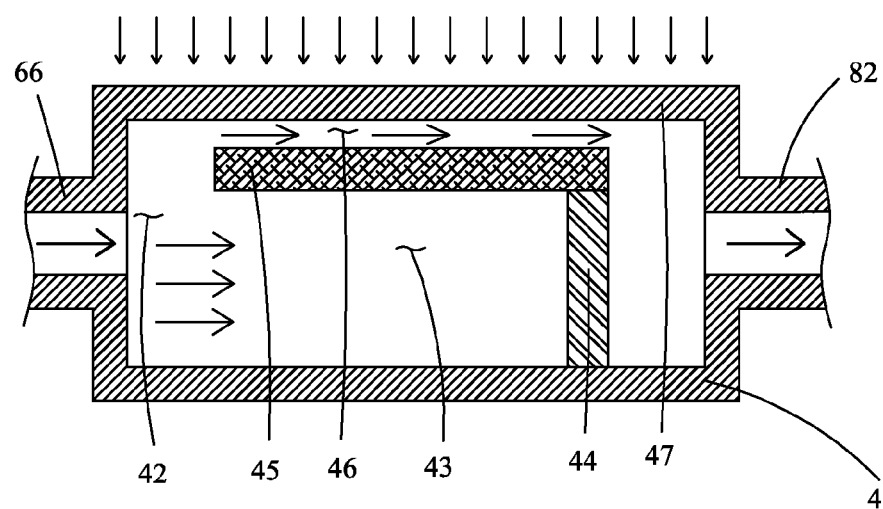
FIG. 5 is a schematic view showing a first evaporator section of the heat dissipation pipe loop according to the present invention.

Specifically, referring to FIGS. 4 and 5, the first evaporator section 2 comprises a first compensation chamber 22 adjacent to the second liquid pipe 86, a first liquid chamber 23 arranged frontward of the first compensation chamber 22, a first stop plate 24 arranged frontward of the first liquid chamber 23, a first capillary body 25 mounted on the first stop plate 24, a first gas passage 26 arranged above the first capillary body 25, and a first heat transfer layer 27 arranged above the first gas passage 26. The second evaporator section 4 comprises a second compensation chamber 42 adjacent to the first liquid pipe 66, a second liquid chamber 43 arranged frontward of the second compensation chamber 42, a second stop plate 44 arranged frontward of the second liquid chamber 43, a second capillary body 45 mounted on the second stop plate 44, a second gas passage 46 arranged above the second capillary body 45, and a second heat transfer layer 47 arranged above the second gas passage 46.

In the first evaporator section 2, the heat dissipation liquid flows in the direction indicated by arrows of FIG. 4. In the second evaporator section 4, the heat dissipation liquid flows in the direction indicated by arrows of FIG. 5.

Specifically, the heat dissipation liquid flows from the second liquid pipe 86 into the first compensation chamber 22 of the first evaporator section 2 connected to the second liquid pipe 86, sequentially passing through the first liquid chamber 23 and the first capillary body 25 of the first evaporator section 2 and absorbing heat transferred through the first heat transfer layer 27 to convert into a gas. The heat dissipation liquid that is evaporated into the gas then passes through the first gas passage 26 of the first evaporator section 2 to flow into the first gas pipe 62 connected to the first evaporator section 2 and then passes through the first condenser pipe 64 that is connected to the first gas pipe 62 to be condensed into a liquid that enters the first liquid pipe 66 and then enters the second evaporator section 4 to thereby achieve repeated cyclic use of the heat dissipation liquid to ensure a bettered effect of heat dissipation. Further, in this structure, a single portion of the heat dissipation liquid can be used by two evaporator sections in a cyclic manner so that the number of portions of the heat dissipation liquid used can be reduced thereby lowering down the manufacture cost. Further, all the components that constitute the heat dissipation pipe loop are integrally formed, so that the operation of assembling is made easier.

Figure 6:
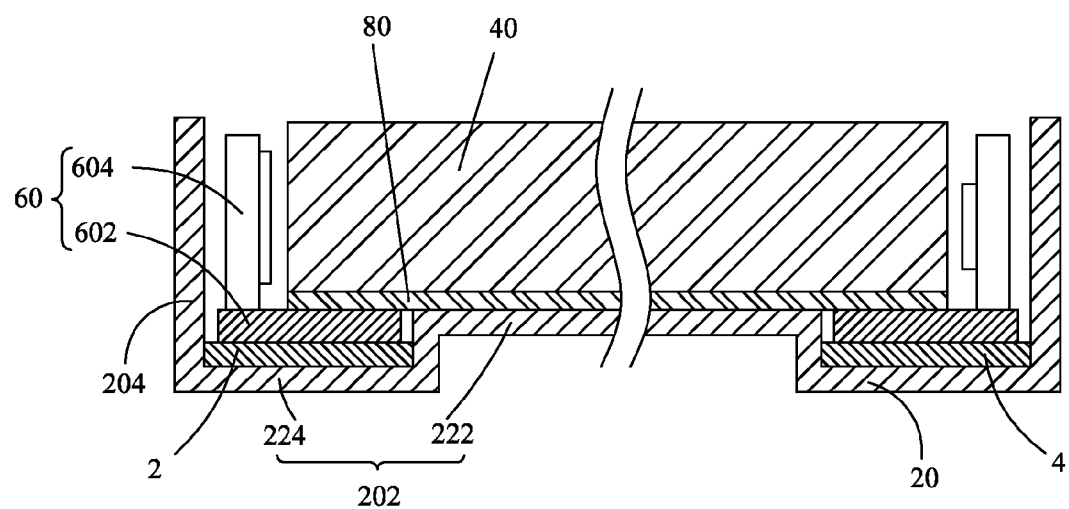
FIG. 6 is a schematic view showing a backlight module using the heat dissipation pipe loop according to the present invention.
Figure 7:
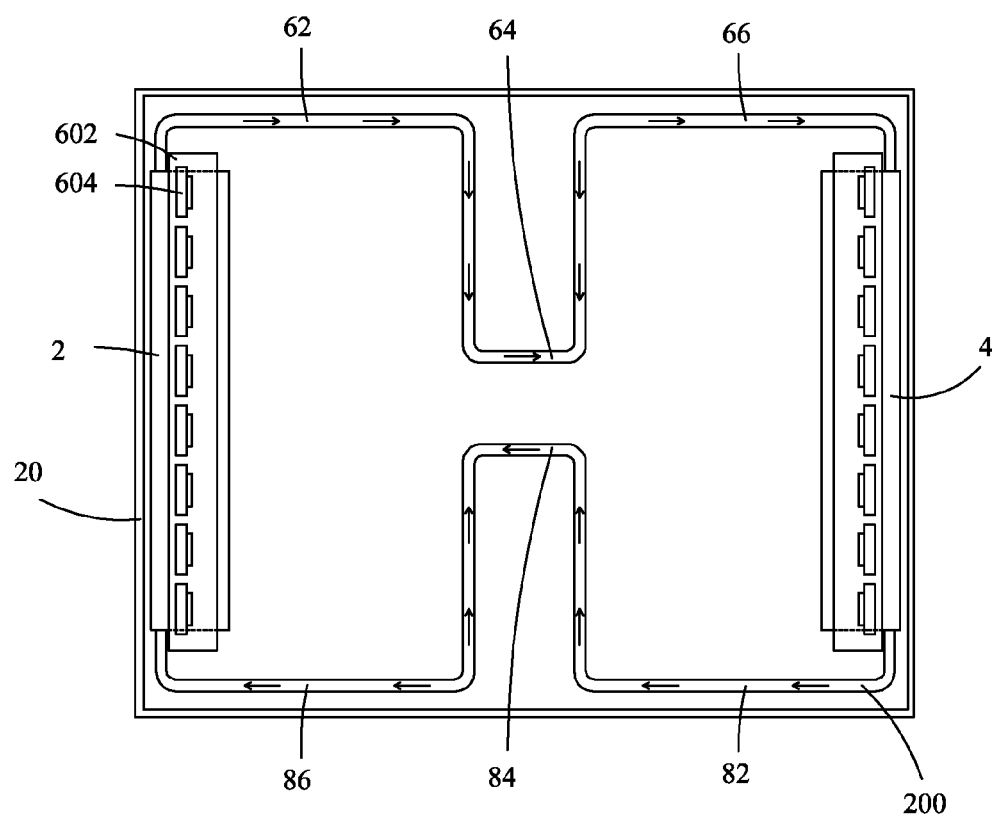
FIG. 7 is a schematic view showing the installation of the heat dissipation pipe loop according to the present invention.

Referring to FIGS. 6 and 7, in combination with FIGS. 3-5, the present invention provides a backlight module using a heat dissipation pipe loop and comprising: a backplane 20, a light guide plate 40 mounted in the backplane 20, two backlight sources 60 mounted in the backplane 20, a heat dissipation pipe loop 200 arranged between the backplane 20 and the backlight sources 60, and a reflector plate 80 arranged between the backplane 20 and the light guide plate 40. Each of the backlight sources 60 comprises a printed circuit board 602 and a plurality of LED lights 604 mounted to and electrically connected with the printed circuit board 602.

The heat dissipation pipe loop 200 comprises: a first evaporator section 2, a second evaporator section 4 arranged opposite to the first evaporator section 2, a first pipe 6 connected to the first evaporator section 2 and the second evaporator section 4, a second pipe 8 connected to the first evaporator section 2 and the second evaporator section 4 and arranged opposite to the first pipe 6, and a heat dissipation liquid arranged in the first pipe 6 and the second pipe 8. The first evaporator section 2, the first pipe 6, the second evaporator section 4, and the second pipe 8 are sequentially connected in a tail end to leading end manner so as to form a closed loop. The first pipe 6 comprises a first gas pipe 62 connected to the first evaporator section 2, a first condenser pipe 64 connected to the first gas pipe 62, and a first liquid pipe 66 connected to the first condenser pipe 64 and the second evaporator section 4. The second pipe 8 comprises a second gas pipe 82 connected to the second evaporator section 4, a second condenser pipe 84 connected to the second gas pipe 82, and a second liquid pipe 86 connected to the second condenser pipe 84 and the first evaporator section 2. The two backlight sources 60 are respectively arranged on the first evaporate section 2 and the second evaporator section 4. Preferably, the first condenser pipe 64 has a U-shaped structure, and the second condenser pipe 84 also has a U-shaped structure. Structurally, the first pipe 6 and the second pipe 8 are arranged to show a symmetric structure, but the symmetric portions thereof are of functions that are not identical. In the instant embodiment, the first condenser pipe 64 and the second condenser pipe 84 are arranged in an inward recessed form in order to reduce the length of the first pipe 6 and the second pipe 8 and thus reduce the area occupied by the heat dissipation pipe loop.

The first pipe 6 and the second pipe 8 are made of at least one of copper and titanium. In the instant embodiment, the first pipe 6 and the second pipe 8 are made of alloys of copper and titanium.

The heat dissipation liquid is filled into the pipes during the manufacture of the heat dissipation pipe loop. Further, in the manufacture, the environment in which the heat dissipation liquid is filled into the heat dissipation pipe loop is a vacuum environment in order to prevent gases of the atmosphere from entering the heat dissipation pipe loop and thus occupying the internal space of the pipes.

The heat dissipation liquid is composed of water, Freon refrigerant, ammonia, or methanol. The heat dissipation liquid flows in the heat dissipation pipe loop in the direction indicated by the arrows of FIG. 3.

Specifically, referring to FIGS. 4 and 5, the first evaporator section 2 comprises a first compensation chamber 22 adjacent to the second liquid pipe 86, a first liquid chamber 23 arranged frontward of the first compensation chamber 22, a first stop plate 24 arranged frontward of the first liquid chamber 23, a first capillary body 25 mounted on the first stop plate 24, a first gas passage 26 arranged above the first capillary body 25, and a first heat transfer layer 27 arranged above the first gas passage 26. The second evaporator section 4 comprises a second compensation chamber 42 adjacent to the first liquid pipe 66, a second liquid chamber 43 arranged frontward of the second compensation chamber 42, a second stop plate 44 arranged frontward of the second liquid chamber 43, a second capillary body 45 mounted on the second stop plate 44, a second gas passage 46 arranged above the second capillary body 45, and a second heat transfer layer 47 arranged above the second gas passage 46.

In the first evaporator section 2, the heat dissipation liquid flows in the direction indicated by arrows of FIG. 4. In the second evaporator section 4, the heat dissipation liquid flows in the direction indicated by arrows of FIG. 5.

Specifically, the heat dissipation liquid flows from the second liquid pipe 86 into the first compensation chamber 22 of the first evaporator section 2 connected to the second liquid pipe 86, sequentially passing through the first liquid chamber 23 and the first capillary body 25 of the first evaporator section 2 and absorbing heat transferred through the first heat transfer layer 27 to convert into a gas. The heat dissipation liquid that is evaporated into the gas then passes through the first gas passage 26 of the first evaporator section 2 to flow into the first gas pipe 62 connected to the first evaporator section 2 and then passes through the first condenser pipe 64 that is connected to the first gas pipe 62 to be condensed into a liquid that enters the first liquid pipe 66 and then enters the second evaporator section 4 to thereby achieve repeated cyclic use of the heat dissipation liquid to ensure a bettered effect of heat dissipation. Further, in this structure, a single portion of the heat dissipation liquid can be used by two evaporator sections in a cyclic manner so that the number of portions of the heat dissipation liquid used can be reduced thereby lowering down the manufacture cost. Further, all the components that constitute the heat dissipation pipe loop are integrally formed, the operation of assembling is made easier.

The printed circuit boards 602 of the two backlight sources 60 are respectively and directly positioned against the first heat transfer layer 27 and the second heat transfer layer 47.

The heat dissipation pipe loop of this structure requires a single portion of the heat dissipation liquid to achieve heat dissipation of two sets of backlight sources 60 so that the number of portions of the heat dissipation liquid used can be reduced thereby lowering down the manufacture cost. Further, all the components that constitute the heat dissipation pipe loop are integrally formed, so that the operation of assembling is made easier.

The backplane 20 comprises a bottom board 202 and a plurality of side boards 204 perpendicularly connected to the bottom board 202. The bottom board 202 comprises a first bottom board section 222 and two second bottom board sections 224 that are arranged to each show a stepped connection with the first bottom board section 222. The printed circuit boards 602 and the first evaporator section 2 and the second evaporator section 4 of the heat dissipation pipe loop 200 are arranged on the second bottom board sections 224 and upper surfaces of the printed circuit boards 602 are substantially flush with an upper surface of the first bottom board section 222. Further, the bottom board 202 of the backplane comprises pipe recesses (not shown) corresponding to the first and second pipes 2, 4 of the heat dissipation pipe loop 200 so as to allow for installation of the heat dissipation pipe loop 200 in the backplane 20.

In summary, the present invention provides a heat dissipation pipe loop and a backlight module using the heat dissipation pipe loop, in which all the components that constitute the heat dissipation pipe loop are integrally formed so as to allow the backlight module that uses the heat dissipation pipe loop to be assembled with an easy operation of easy and also allow heat dissipation from a plurality of LED lights of two sets of backlight sources to be achieved with only one portion of heat dissipation liquid filled therein thereby ensuring a bettered effect of heat dissipation, lowering down the manufacture costs of the heat dissipation pipe loop and the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A heat dissipation pipe loop, comprising: a first evaporator section, a second evaporator section arranged opposite to the first evaporator section in a given direction, a first pipe connected to the first evaporator section and the second evaporator section, a second pipe connected to the first evaporator section and the second evaporator section and arranged opposite to the first pipe and a heat dissipation liquid arranged in the first pipe and the second pipe, the first evaporator section, the first pipe, the second evaporator section, and the second pipe being sequentially connected in a tail end to leading end manner so as to form a closed loop, the first pipe comprising a first gas pipe connected to the first evaporator section, a first condenser pipe connected to the first gas pipe, and a first liquid pipe connected to the first condenser pipe and the second evaporator section, the second pipe comprising a second gas pipe connected to the second evaporator section, a second condenser pipe connected to the second gas pipe, and a second liquid pipe connected to the second condenser pipe and the first evaporator section, wherein each of the first and second condenser pipes comprises a U-shaped pipe section extending toward each other and wherein each of the U-shaped pipe sections is connected between the first evaporator section and the second evaporator section and the U-shaped sections are arranged toward each other in a direction that is substantially normal to the given direction in which the second evaporator is opposite to the first evaporator section.

2. The heat dissipation pipe loop as claimed in claim 1, wherein the first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage.

3. The heat dissipation pipe loop as claimed in claim 1, wherein the heat dissipation liquid is composed of water, Freon refrigerant, ammonia, and methanol.

4. The heat dissipation pipe loop as claimed in claim 1, wherein the first pipe and the second pipe are made of at least one of copper and titanium.

5. A backlight module that uses a heat dissipation pipe loop, comprising: a backplane, a light guide plate mounted in the backplane, two backlight sources mounted in the backplane, a heat dissipation pipe loop arranged between the backplane and the backlight sources, and a reflector plate arranged between the backplane and the light guide plate, the heat dissipation pipe loop comprising: a first evaporator section, a second evaporator section arranged opposite to the first evaporator section in a given direction, a first pipe connected to the first evaporator section and the second evaporator section, a second pipe connected to the first evaporator section and the second evaporator section and arranged opposite to the first pipe and a heat dissipation liquid arranged in the first pipe and the second pipe, the first evaporator section, the first pipe, the second evaporator section, and the second pipe being sequentially connected in a tail end to leading end manner so as to form a closed loop, the first pipe comprising a first gas pipe connected to the first evaporator section, a first condenser pipe connected to the first gas pipe, and a first liquid pipe connected to the first condenser pipe and the second evaporator section, the second pipe comprising a second gas pipe connected to the second evaporator section, a second condenser pipe connected to the second gas pipe, and a second liquid pipe connected to the second condenser pipe and the first evaporator section, the two backlight sources being respectively arranged on the first evaporator section and the second evaporator section, wherein each of the first and second condenser pipes comprises a U-shaped pipe section extending toward each other; and wherein each of the U-shaped pipe sections is connected between the first evaporator section and the second evaporator section and the U-shaped sections are arranged toward each other in a direction that is substantially normal to the given direction in which the second evaporator is opposite to the first evaporator section.

6. The backlight module that uses the heat dissipation pipe loop as claimed in claim 5, wherein the first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage.

7. The backlight module that uses the heat dissipation pipe loop as claimed in claim 5, wherein the heat dissipation liquid is composed of water, Freon refrigerant, ammonia, and methanol.

8. The backlight module that uses the heat dissipation pipe loop as claimed in claim 5, wherein the first pipe and the second pipe are made of at least one of copper and titanium.

9. The backlight module that uses the heat dissipation pipe loop as claimed in claim 6, wherein each of the backlight sources comprises a printed circuit board and a plurality of LED (Light-Emitting Diode) lights mounted to and electrically connected with the printed circuit board, the two printed circuit boards of the two backlight sources being respectively and directly positioned against the first heat transfer layer and the second heat transfer layer.

10. The backlight module that uses the heat dissipation pipe loop as claimed in claim 9, wherein the backplane comprises a bottom board and a plurality of side boards perpendicularly connected to the bottom board, the bottom board comprising a first bottom board section and two second bottom board sections that are arranged to each show a stepped connection with the first bottom board section, the printed circuit boards and the first evaporator section and the second evaporator section of the heat dissipation pipe loop being arranged on the second bottom board sections, upper surfaces of the printed circuit boards being substantially flush with an upper surface of the first bottom board section.

11. A backlight module that uses a heat dissipation pipe loop, comprising: a backplane, a light guide plate mounted in the backplane, two backlight sources mounted in the backplane, a heat dissipation pipe loop arranged between the backplane and the backlight sources, and a reflector plate arranged between the backplane and the light guide plate, the heat dissipation pipe loop comprising: a first evaporator section, a second evaporator section arranged opposite to the first evaporator section in a given direction, a first pipe connected to the first evaporator section and the second evaporator section, a second pipe connected to the first evaporator section and the second evaporator section and arranged opposite to the first pipe and a heat dissipation liquid arranged in the first pipe and the second pipe, the first evaporator section, the first pipe, the second evaporator section, and the second pipe being sequentially connected in a tail end to leading end manner so as to form a closed loop, the first pipe comprising a first gas pipe connected to the first evaporator section, a first condenser pipe connected to the first gas pipe, and a first liquid pipe connected to the first condenser pipe and the second evaporator section, the second pipe comprising a second gas pipe connected to the second evaporator section, a second condenser pipe connected to the second gas pipe, and a second liquid pipe connected to the second condenser pipe and the first evaporator section, the two backlight sources being respectively arranged on the first evaporator section and the second evaporator section;

wherein the first evaporator section comprises a first compensation chamber adjacent to the second liquid pipe, a first liquid chamber arranged frontward of the first compensation chamber, a first stop plate arranged frontward of the first liquid chamber, a first capillary body mounted on the first stop plate, a first gas passage arranged above the first capillary body, and a first heat transfer layer arranged above the first gas passage and the second evaporator section comprises a second compensation chamber adjacent to the first liquid pipe, a second liquid chamber arranged frontward of the second compensation chamber, a second stop plate arranged frontward of the second liquid chamber, a second capillary body mounted on the second stop plate, a second gas passage arranged above the second capillary body, and a second heat transfer layer arranged above the second gas passage;

wherein each of the first and second condenser pipes comprises a U-shaped pipe section extending toward each other; and wherein each of the U-shaped pipe sections is connected between the first evaporator section and the second evaporator section and the U-shaped sections are arranged toward each other in a direction that is substantially normal to the given direction in which the second evaporator is opposite to the first evaporator section.

12. The backlight module that uses the heat dissipation pipe loop as claimed in claim 11, wherein each of the backlight sources comprises a printed circuit board and a plurality of LED (Light-Emitting Diode) lights mounted to and electrically connected with the printed circuit board, the two printed circuit boards of the two backlight sources being respectively and directly positioned against the first heat transfer layer and the second heat transfer layer.

13. The backlight module that uses the heat dissipation pipe loop as claimed in claim 11, wherein the heat dissipation liquid is composed of water, Freon refrigerant, ammonia, and methanol.

14. The backlight module that uses the heat dissipation pipe loop as claimed in claim 11, wherein the first pipe and the second pipe are made of at least one of copper and titanium.

15. The backlight module that uses the heat dissipation pipe loop as claimed in claim 12, wherein the backplane comprises a bottom board and a plurality of side boards perpendicularly connected to the bottom board, the bottom board comprising a first bottom board section and two second bottom board sections that are arranged to each show a stepped connection with the first bottom board section, the printed circuit boards and the first evaporator section and the second evaporator section of the heat dissipation pipe loop being arranged on the second bottom board sections, upper surfaces of the printed circuit boards being substantially flush with an upper surface of the first bottom board section.

* * * * *